(12) United States Patent
Schumann (10) Patent No.: US 12,228,716 B2
(45) Date of Patent: Feb. 18, 2025

(54) MICROSCOPE AND METHOD FOR IMAGING AN OBJECT USING A MICROSCOPE

(71) Applicant: Leica Microsystems CMS GmbH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 490 days.

(21) Appl. No.: 17/638,213

(22) PCT Filed: Sep. 2, 2019

(86) PCT No.: PCT/EP2019/073297
§ 371 (c)(1),
(2) Date: Feb. 25, 2022

(87) PCT Pub. No.: WO2021/043383
PCT Pub. Date: Mar. 11, 2021

(65) Prior Publication Data
US 2022/0317429 A1  Oct. 6, 2022

(51) Int. Cl.
*G02B 21/00* (2006.01)
*G02B 21/36* (2006.01)

(52) U.S. Cl.
CPC ....... *G02B 21/0036* (2013.01); *G02B 21/367* (2013.01); *G02B 21/0032* (2013.01)

(58) Field of Classification Search
CPC .............. G02B 21/0036; G02B 21/367; G02B 21/0032; G02B 21/00; G02B 21/0004;
(Continued)

(56) References Cited

U.S. PATENT DOCUMENTS 8,582,203 B2  11/2013 Dunsby
2008/0259423 A1  10/2008 Frekers et al.
(Continued)

FOREIGN PATENT DOCUMENTS

DE  10 2016 119268 B3  12/2017
EP       2 098 900 A1   9/2009
(Continued)

OTHER PUBLICATIONS

V. Maioli et al., "Time-lapse 3-D measurements of a glucose biosensor in multicellular spheroids by light sheet fluorescence microscopy in commercial 96-well plates", Scientific Reports vol. 6, Article No. 37777, Nov. 25, 2016, pp. 1-18, Nature, UK.
(Continued)

*Primary Examiner* — Arnel C Lavarias
(74) *Attorney, Agent, or Firm* — LEYDIG, VOIT & MAYER, LTD.

(57) ABSTRACT

A microscope includes: a motorized object stage for moving an object; an optical imaging system for forming an optical image of a plane (OE) in which the object is to be optically imaged; an optical scanning unit for moving the plane (OE) to be optically imaged by the optical imaging system relative to the optical imaging system; an image sensor for detecting the optical image of the plane (OE) formed by the optical imaging system; and a controller for controlling the motorized object stage and the optical scanning unit for simultaneously moving the object and the plane (OE) in a same direction relative to the optical imaging system while the optical image is being detected by the image sensor.

15 Claims, 6 Drawing Sheets

(58) Field of Classification Search
CPC .............. G02B 21/002; G02B 21/0048; G02B 21/0052; G02B 21/006; G02B 21/0072; G02B 21/0076; G02B 21/06; G02B 21/26; G02B 21/36; G02B 21/361; G02B 21/365
USPC ....... 359/381, 362, 363, 368, 369, 385, 388, 359/390, 391, 433
See application file for complete search history.

(56) References Cited

U.S. PATENT DOCUMENTS

| | | | |
|---|---|---|---|
| 2012/0140240 A1 | 6/2012 | Hillman et al. | |
| 2014/0152793 A1* | 6/2014 | Staker | H04N 25/441 |
| | | | 348/79 |
| 2014/0152888 A1* | 6/2014 | Staker | G02B 27/646 |
| | | | 348/373 |
| 2018/0252936 A1* | 9/2018 | Owens | G02B 26/101 |
| 2019/0243118 A1 | 8/2019 | Schumann | |

FOREIGN PATENT DOCUMENTS

| | | |
|---|---|---|
| JP | 2000 171719 A | 6/2000 |
| WO | WO 2006/024279 A1 | 3/2006 |
| WO | WO 2013/184762 A1 | 12/2013 |

OTHER PUBLICATIONS

M. Bouchard et al., "Swept confocally-aligned planar excitation (SCAPE) microscopy for high-speed volumetric imaging of behaving organisms—Supplementary Information", Nature Photonics, vol. 9, pp. 1-22, Feb. 1, 2015, Nature, UK.

* cited by examiner

MICROSCOPE AND METHOD FOR IMAGING AN OBJECT USING A MICROSCOPE

CROSS-REFERENCE TO PRIOR APPLICATIONS

This application is a U.S. National Phase application under 35 U.S.C. § 371 of International Application No. PCT/EP2019/073297, filed on Sep. 2, 2019. The International Application was published in English on Mar. 11, 2021 as WO 2021/043383 under PCT Article 21(2).

FIELD

The present invention relates to a microscope comprising a motorized object stage for moving an object. Further, the present invention relates to a method for imaging an object using a microscope which comprises a motorized object stage.

BACKGROUND

In the field of microscopy, attempts have been made to enable imaging of larger objects or imaging of a plurality of objects in a single imaging process. For instance, in case that a microscope comprises a motorized object stage, it may envisaged to use the object stage for enlarging the object area or the number of objects to be processed in a predetermined period of time. For an OPM configuration (OPM: oblique plane microscope) such an approach is disclosed in V. Maioli et al., "Time-lapse 3-D measurements of a glucose biosensor in multicellular spheroids by light sheet fluorescence microscopy in commercial 96-well plates", Scientific Reports volume 6, Article number: 37777 (2016). However, this approach has the disadvantage that the speed at which the object stage can be operated to move the object(s) is limited by the exposure time of the image sensor detecting the optical image formed by the OPM optical system. Thus, the stage speed must be sufficiently low in order to avoid any movement artefacts within the exposure time of the image sensor. Alternatively, movement of the object stage has to be stopped during light exposure of the image sensor. However, in case of liquid objects commonly used in biological microscopy, stopping the movement of the object stage causes wave movements in the object resulting in movement artefacts. As a result, the object stage should be operated at low and constant speed in order to avoid any movement artefacts from occurring. Accordingly, the throughput of objects to be imaged is significantly limited.

Another approach for a SCAPE configuration (SCAPE: swept confocally-aligned planar excitation) is to laterally shift the field of view of the microscope as e.g. disclosed in M. Bouchard et al., "Swept confocally-aligned planar excitation (SCAPE) microscopy for high-speed volumetric imaging of behaving organisms", Nature Photonics, Volume 9, pages 113-119 (2015). This approach uses a scan mirror which is effective only within the field of view of the SCAPE optical system. Thus, only a static image field is implemented, this image field being limited by the field of view of the optical system. As a result, larger objects or a larger number of objects e.g. located in microtiter plates cannot be efficiently examined.

SUMMARY

In an embodiment, the present invention provides a microscope, comprising: a motorized object stage configured to move an object; an optical imaging system configured to form an optical image of a plane (OE) in which the object is to be optically imaged; an optical scanning unit configured to move the plane (OE) to be optically imaged by the optical imaging system relative to the optical imaging system; an image sensor configured detect the optical image of the plane (OE) formed by the optical imaging system; and a controller configured to control the motorized object stage and the optical scanning unit for simultaneously moving the object and the plane (OE) in a same direction relative to the optical imaging system while the optical image is being detected by the image sensor.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a microscope and a method enabling fast imaging of a large object or a large number of objects without causing movement artefacts.

The microscope comprises a motorized object stage configured to move an object, an optical imaging system configured to form an optical image of a plane in which said object is to be optically imaged, an optical scanning unit configured to move said plane to be optically imaged by said optical imaging system relative to said optical imaging system, an image sensor configured to detect said optical image of said plane formed by said optical imaging system, and a controller configured to control said motorized object stage and said optical scanning unit for simultaneously moving said object and said plane in the same direction relative to said optical imaging system while said optical image being detected by said image sensor.

The afore-mentioned plane to be optically imaged by the optical imaging system represents an object plane from which an optical image is generated. In the present context, it should be noted that the term "plane" is not to be understand restrictively in a mathematical sense as a strict two-dimensional plane. Rather, the plane is to be understood as a more or less flatly extended area of the object from which light is received by the imaging optical system in order to form an optical image of the object area.

Accordingly, the microscope enables the plane to be imaged by the optical imaging system to track the object being moved by the motorized object stage. For this, the optical scanning unit is controlled cooperatively with the object stage for moving the afore-mentioned plane relative to the optical imaging system in a manner that the object and the plane perform a synchronized movement relative to the optical imaging system while the image sensor is detecting the optical image formed by the optical imaging system. The movement of the plane to be imaged caused by the optical scanning unit corresponds to a movement of the field of view synchronized with the movement of the object. Thus, any movement artefact otherwise caused by moving the object within the field of view of the optical imaging system can be avoided. As a result, an image field stabilization is achieved allowing an imaging of laterally extended objects or an increase in the number of objects to be processed. In particular, it is possible to move the object stage at a relatively high, preferably constant speed without having to stop the object stage during image acquisition. Specifically, the motorized object stage can be operated without being restricted by the image sensor exposure time which is a limiting factor in prior art configurations.

The optical scanning unit may be configured to move said plane perpendicularly to the optical axis of the optical imaging system.

Preferably, the controller is configured to control the motorized object stage and the optical scanning unit such that the plane is stationary relative to the object while the optical image being detected by the image sensor. In such an embodiment, the object stage and the scanning unit are operated in a manner enabling synchronous movements of the image and the plane to be imaged in terms of speed and moving direction. As the plane to be imaged remains stationary relative to the moving object, any movement artefacts can be avoided from occurring.

Preferably, the optical imaging system has a first field of view, and the image sensor has a second field of view, said second field of view being encompassed by said first field of view. In other words, the optical scanning unit is used for virtually moving the second field of view of the image sensor within the larger first of field of view of the optical imaging system, wherein said first field of view can be considered to be stationary.

In a preferred embodiment, the controller is configured to control the motorized object stage and the optical scanning unit such that the second field of view including the optical image of the plane is kept encompassed by the first field of view while the second field of view being detected by the image sensor and being moved thereon.

Preferably, an area of the first field of view currently not overlapped by the second field of view forms a field of view reserve to be used for enabling the second field of view to move within the first field of view. The afore-mentioned field of view reserve may be determined such that it allows a sufficient tracking movement of the plane to be imaged. In this respect, the exposure time of the image sensor may be taken into account for determining the field of view reserve.

In a preferred embodiment, the controller is configured to control the motorized object stage for moving the object at a constant speed. Operating the object stage at a constant speed facilitates to control the optical scanning unit in synchronization with the object stage.

Preferably, the controller is configured to control the image sensor for detecting the optical image in a sequence of consecutive images, each image of said sequence representing said optical image. In this embodiment, each image of the afore-mentioned sequence may be acquired while controlling the motorized object stage and the optical scanning unit in synchronization with each other as described above.

Preferably, the controller is configured to control the optical scanning unit for moving the plane at a constant speed while each image of said sequence being detected by the image sensor. Moving the plane at a constant speed facilitates to control the optical scanning unit, in particular in case that the motorized object stage is operated at a constant speed likewise.

Preferably, the controller is configured to control the optical scanning unit for moving the plane starting from an initial position to an end position while each image of said sequence being detected by the image sensor. The initial and end positions limiting the movement of the afore-mentioned plane may be determined taking into account the exposure time required by the image sensor for detecting a single image and the speed at which the object stage is being moved.

The initial position may be the same for all images of the sequence. Further, the afore-mentioned end position may be the same for all images of the sequence, likewise. In this case, after acquisition of a single image has been completed, the optical scanning unit is reset to an initial state when starting the next image acquisition, wherein said initial state is the same as in the previous image acquisition. Such an embodiment may be advantageously used for recording an image stack, the step size thereof being defined by the afore-mentioned initial and end positions of the plane which is moved by means of the optical scanning unit. Specifically, the step size $\Delta s$ may be expressed by following equation:

$$\Delta s = -v_t \tau, \quad (1)$$

wherein $v_t$ designates the speed of the object stage, and $\tau$ designates the exposure time of the image sensor.

In a preferred embodiment, the controller is configured to let the afore-mentioned initial position drift within said sequence. In this case, the step size deviates from $\Delta s$ as indicated in equation (1). Rather, a modified step size $\Delta s'$ being smaller than $\Delta s$ is applied, wherein $\Delta s'$ results in a drift or residual shift for each image acquisition. This drift d may be expressed by following equation:

$$d = \Delta s - \Delta s'. \quad (2)$$

The drift d represents a drift of the field of view of the image sensor within the field of view of the optical imaging system. In case that a field of view reserve is provided as described above, such a drift can be tolerated and compensated by the optical scanning unit provided that an accumulated drift D satisfies following condition:

$$D = l_0(v_t \tau - 1) < F_a \quad (3)$$

wherein $l_0$ designates a dimension of the object to be imaged, and $F_a$ designates the field of view reserve. The dimension $l_0$ may be known in advance or at least limited. As already explained above, the field of view reserve $F_a$ is represented by an amount, by which the field of view of the optical imaging system is larger than the field of view of the image sensor (measured in direction of movement of the plane to be imaged).

In a preferred embodiment, the controller is configured to determine a predetermined starting condition for simultaneously moving the object and the plane, said object being moved and said plane being kept stationary relative to the optical imaging system before determining said starting condition. In this embodiment, dynamically positioning the field of view of the image sensor within the stationary field of view of the optical imaging system may be used to achieve a reduction of recorded image data before starting the actual image acquisition. Thus, in an exemplary situation in which it can be assumed that a certain portion of the object stage comprises only single regions of interest, e.g. single distinct objects being spatially separated from each other, the field of view reserve may be used for positioning the field of view of the image sensor at an edge of the field of view of the optical imaging system and for continuously recording image data into a buffer memory. In this case, the data rate may be reduced by binning, and the light exposure may be reduced by lowering illumination intensity. Then, the actual image acquisition is only started when said starting condition is determined. Thus, before determining the starting condition, an image acquisition based on lower data rate and/or lower illumination may be performed.

Preferably, the controller is configured to control the image sensor for detecting a test image and to analyze the test image for determining said predetermined starting condition, said predetermined starting condition indicating a region of interest of said object being captured by said test image. Capturing the afore-mentioned test image serves e.g. to determine whether or not an object to be imaged is detected. Once an object to be imaged is detected, the field of view reserve may be used in order to control the optical scanning unit for causing the tracking operation of the field of view of the image sensor as described above. While performing the tracking operation, the actual, high-quality image acquisition may be conducted. Thus, whereas the test image may be generated with low data rate, low illumination, and long exposure time, the actual image acquisition may be performed with high data rate, high illumination and short exposure time. In particular, before determining the starting condition, long exposure times are not considered to be detrimental as movement artefacts may be tolerated when generating the test image.

The high quality image acquisition may be finished when e.g. one of the following conditions are met: continuously recording the image data stream indicates that a complete image of the (contiguous) object is recorded; a given number of individual images and thus a given volume has been captured; the field of view reserve is used up in case of the afore-mentioned drift implementation. An exemplary application of this embodiment may be imaging of 3D cell cultures (e.g. multi-cell spheroids) in microtiter plates. Depending on the preparation, it may be assumed that the individual objects are connected and that there is only one single object in each microtiter cavity roughly centered therein. Due to the asymmetry of the field of view in an OPM or SCAPE configuration caused by the inclination of the plane to be imaged, this embodiment is particularly beneficial when using an OPM or SCAPE configuration for the imaging 3D cell cultures in microtiter plates.

Preferably, the microscope is formed by a light sheet microscope. For instance, such a light sheet microscope may comprise a single objective lens facing the object and used for both illumination and detection. In particular, the microscope may be provided in an OPM or SCAPE configuration. For instance, according to an OPM configuration, the microscope may comprise an optical transport system and an optical detection system forming the optical imaging system, as well as an optical illumination system. In this case, the optical axis of the optical transport system, the optical detection system and the optical illumination system converge into an intermediate image space, i.e. intersect each other therein. However, other configurations are possible, in particular in terms of coupling the illumination light into the system. For example, the invention may be applied to light sheet configurations as disclosed in U.S. Pat. No. 8,582,203 B2 and US 2012 014 0240 A1.

According to another aspect, a method for imaging an object using a microscope is provided, comprising the following steps: moving said object by means of a motorized object stage; forming an optical image of a plane in which said object is to be optically imaged by means of an optical imaging system; moving said plane to be optically imaged by said optical imaging system relative to said optical imaging system by means of an optical scanning unit; detecting said optical image of said plane formed by said optical imaging system by means of an image sensor; and controlling said motorized object stage and said optical scanning unit for simultaneously moving said object and said plane in the same direction relative to said optical imaging system while said optical image being detected by said image sensor.

Referring to the diagram of FIG. 1, a configuration of a microscope 100 according to an embodiment will be explained hereinafter.

Figure 1:
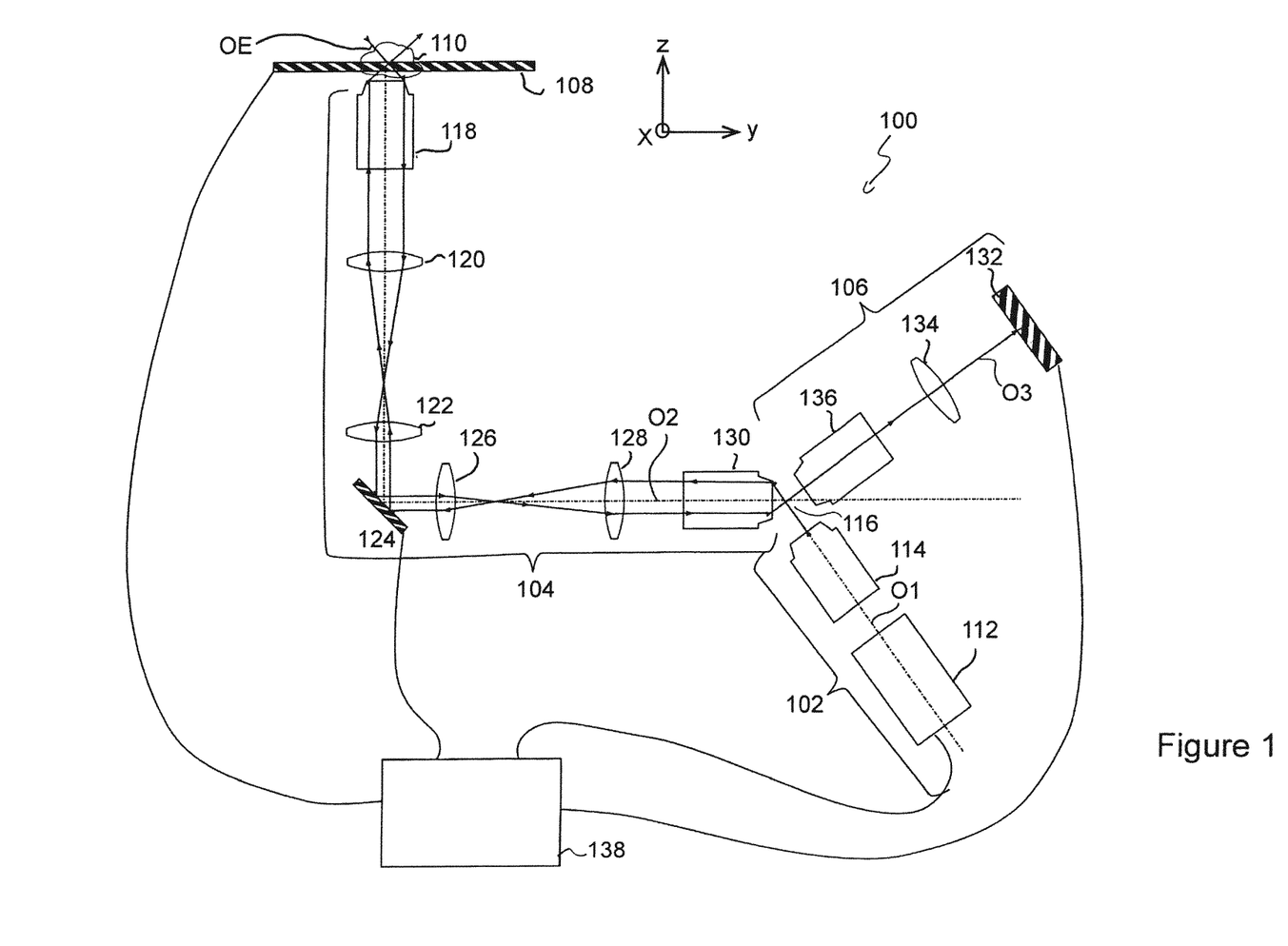
FIG. 1 is a diagram illustrating a configuration of a microscope according to an embodiment.

According to the embodiment shown in FIG. 1, the microscope 100 comprises an OPM configuration without being restricted thereto. Accordingly, the microscope 100 comprises an optical illumination system 102, an optical transport system 104, and an optical detection system 106. Optical axes O1, O2, O3 of the optical illumination system 102, the optical transport system 104, and the optical detection system 106, respectively, converge into an intermediate image space 116, i.e. intersect each other therein.

The microscope 10 further comprises a motorized object stage 108 holding an object 110 to be imaged by means of the microscope 100. According to the specific embodiment shown in FIG. 1, the object stage 110 is movable by a motor (not shown in FIG. 1) in a lateral direction, i.e. in a direction perpendicular to the optical axis O2 of the optical transport system. Accordingly, the object stage 108 is configured to move the object 110 in lateral direction parallel to a y-axis referring to an orthogonal coordinate system as indicated in FIG. 1.

The optical illumination system 102 comprises a light source (not shown in FIG. 1), a light sheet generating device 112 and an objective 114 facing the intermediate image space 116. The light sheet generating device may comprise a cylinder lens which is configured to focus the illumination light emitted by the light source in only one direction to form a light sheet. Alternatively, the light sheet generating device may comprise a scanner causing a scanning movement of the illumination light to dynamically create the light sheet. Accordingly, the optical illumination system 102 serves to focus the light sheet in the intermediate image space.

The optical transport system 104 comprises an objective 118 facing the object 110, a tube lens 120, a scan lens 122, an optical scanning unit 124, a scan lens 126, a tube lens 128, and an objective 130 facing the intermediate image space 116. The optical scanning unit 124 may comprise a galvanometer mirror which is tiltable around one or more axes, and is positioned in or close to a plane conjugate with the back focal plane of the objective 118, which represents the pupil plane of the telecentric optical transport system 104. According to the specific embodiment shown in FIG. 1, it is assumed that the optical scanning unit 124 is tiltable around an axis lying perpendicular to the optical axis O2 of the optical transport system 104 and perpendicular to the drawing sheet. Needless to say that such a configuration of the optical scanning 124 unit is only exemplary. Any other suitable configuration may be used, for instance a digital micromirror device (DMD).

The optical detection system 106 comprises an image sensor 132, a tube lens 134, and an objective 136 facing the intermediate image space 116. The image sensor 132 is formed e.g. by a camera comprising a plurality of pixel elements which are configured to convert light received by the image sensor 132 into electrical signals.

The microscope 100 further comprises a controller 138 which may be configured to control the overall operation of the microscope 100. In the present context, the controller 138 in particular serves to control the motorized object stage 108, the optical scanning unit 124, the light sheet generating device 112, and the image sensor 132.

As already mentioned above, the optical illumination system 102, the optical transport system 104, and the optical detection system 106 are arranged in a such a way that their optical axes O1, O2, and O3 converge into the intermediate image space 116. Thus, the light sheet focused by the optical illumination system 102 into the intermediate image space is imaged by the optical transport system 104 into the object 110 located on the motorized object stage 108. According to the configuration shown in FIG. 1, a plane OE within the object 110 is illuminated by the light sheet.

In the specific OPM configuration as shown in FIG. 1, the plane OE is oriented obliquely relative to the optical axis O2 of the optical transport system 104. The plane OE illuminated by the light sheet is excited to emit fluorescent light which is captured by the objective 118 facing the object 110. Accordingly, the optical transport system 104 images the plane OE within the object 110 in form of an intermediate image into the intermediate image space 116. The intermediate image of the plane OE is imaged by the optical detection system 106 onto the image sensor 132.

The optical transport system 104 and the optical detection system 106 form an optical image system which is configured to form an optical image of the plane OE on the image sensor 132. Accordingly, the image sensor 132 detects the optical image of the plane OE formed by the afore-mentioned optical imaging system 104, 106. As can be understood from the above, the optical scanning unit 124 is configured to move the plane OE which is to be optically imaged by the optical imaging system 104, 106 relative thereto. According to the specific example shown in FIG. 1, the optical scanning unit 124 is used to move the plane OE in the lateral direction y relative to the objective 118 facing the motorized object stage 108.

The object stage 108 is movable relative to the optical imaging system 104, 106 to enable processing of larger objects or a large number of objects. In order to avoid movements artefacts from occurring due to shifting the object 110 relative to the optical imaging system 104, 106, the controller 138 is configured to control the motorized object stage 108 and the optical scanning unit 124 for simultaneously moving the object 110 and the plane OE in the same direction relative to the optical imaging system 104, 106 while the optical image being detected by the image sensor 132. In particular, the controller 138 operates the object stage 108 and the optical scanning unit 124 in such way that the plane OE is stationary relative to the object 110 moving along with the object stage 108 while the optical image of the plane OE is being detected by the image sensor 132.

Figure 2:
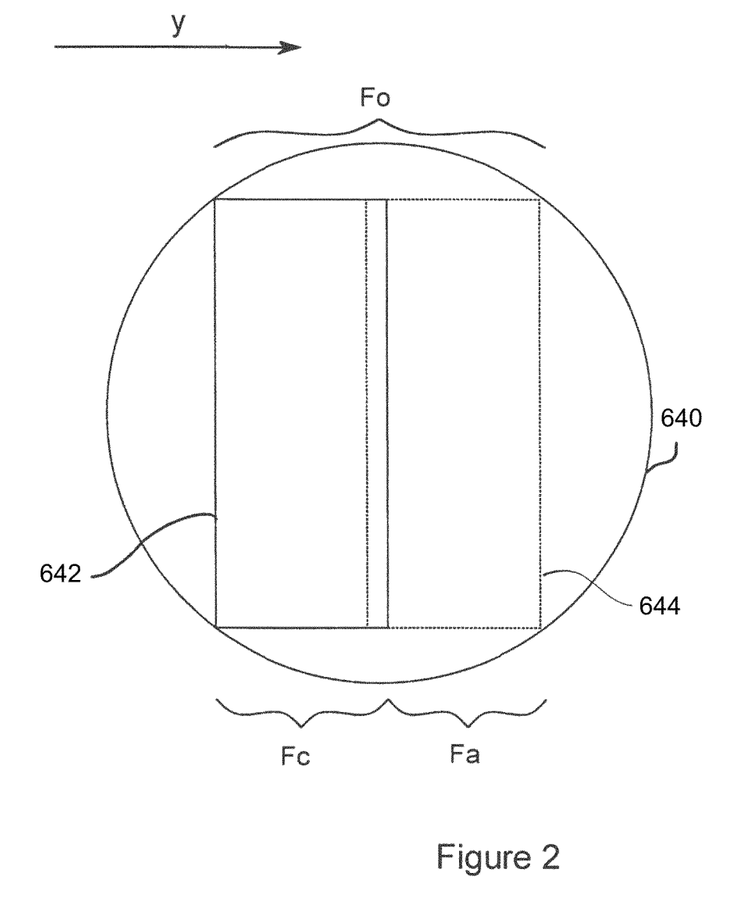
FIG. 2 is a diagram illustrating the relationship between the fields of view of an optical imaging system and an image sensor of the microscope shown in FIG. 1.

The diagram of FIG. 2 illustrates how the optical imaging system 104, 106 and the image sensor 132 may be adapted to each other in terms of their fields of view in order to enable the motorized object stage 108 and the optical scanning unit 124 to be controlled as described above. Thus, FIG. 2 shows a first field of view 640 associated with the optical imaging system 104, 106 and a second field of view 642 associated with the image sensor 132. A length of the first field of view 640 in direction y is referred to as Fo. Likewise, a length of the second field of view 642 in direction y is referred to as Fc.

FIG. 2 further illustrates a shift of the second field of view 642 associated with the image sensor 132 within the first field of view 640 associated with the optical imaging system 104, 106 when the optical scanning unit 124 moves the plane OE to be imaged in direction y relative to the optical imaging system 104, 106. As can be seen from FIG. 2, the motorized object stage 108 and the optical scanning unit 124 are controlled in such a way that the second field of view 642 including the optical image of the plane OE is kept encompassed by the first field of view while the second field of view 642 being detected by the image sensor 132 and being moved thereon. The second field of view having moved from the right to the left in FIG. 2 is illustrated with dotted lines (referred to as 644 in FIG. 2).

As further illustrated in FIG. 2, the fields of view 640, 642 of the optical imaging system 104 and the image sensor 132 are adapted to each other such that a field of view reserve Fa is provided in direction y. The field of view reserve Fa may be used for enabling the second field of view 642 to move within the first field of view 640 in direction y. Assumed that the second field of view 642 refers to an initial position of the plane OE not yet moved, an area of the first field of view 640, which is not overlapped by the second field of view 642 in this initial position, represents the afore-mentioned field of view reserve Fa (referring to direction y).

Figure 3:
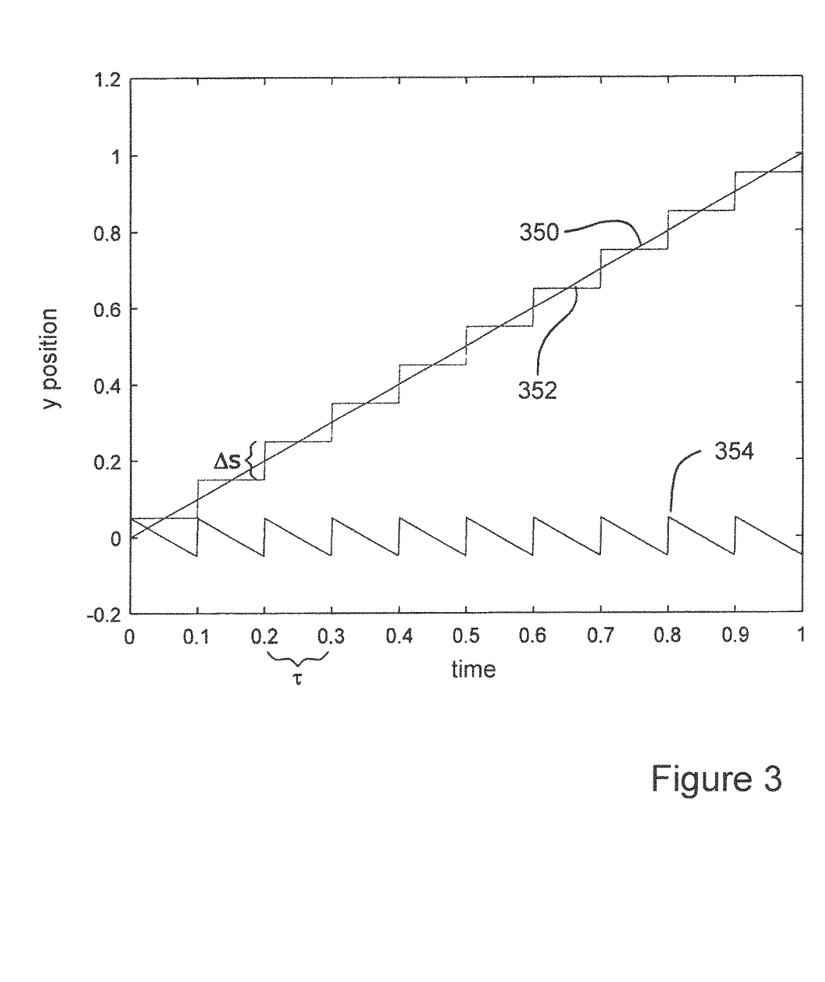
FIG. 3 is a time diagram illustrating an embodiment for controlling a motorized object stage and an optical scanning unit in synchronization with each other.

FIG. 3 shows a time diagram illustrating a specific example for controlling the motorized object stage 108 and the optical scanning unit 124 in order to avoid movement artefacts from occurring. In FIG. 3, the horizontal axis represents the time, wherein T designates the exposure time of the image sensor 132. The vertical axis of the diagram shown in FIG. 3 represents a position in y direction.

According to the embodiment illustrated in FIG. 3, the object stage 108 is moved at a constant speed in direction y as indicated by a stage trajectory 350, the slope thereof representing the stage speed. In order to avoid any movement artefacts possibly caused by the stage movement, the optical scanning unit 124 is controlled such that the plane OE tracks the movement of the object stage 108 in each image acquisition. In other words, during exposure time T required for imaging the plane OE in a single image acquisition, the plane OE is kept stationary relative to the object 110 which is moved together with the object stage 108. For this, the optical scanning unit 124 is operated to move the plane OE in direction y at a speed being equal to the stage speed vt when detecting a single image of the plane OE by means of the image sensor 132. Keeping the plane OE stationary with respect to the object 110 is indicated by a plane trajectory 352 in FIG. 3, said plane trajectory 352 illustrating the movement of the plane OE relative to the moving object 110.

Before starting the next image acquisition, the optical scanning unit 124 is reset into an initial position which is the same as in the previous image acquisition as can be seen from a scanning trajectory 354. Thus, the optical scanning unit 124 is reset by the amount Δs as defined in equation (1) explained above. The reset amount Δs can be derived from the plane trajectory 352.

Figure 4:
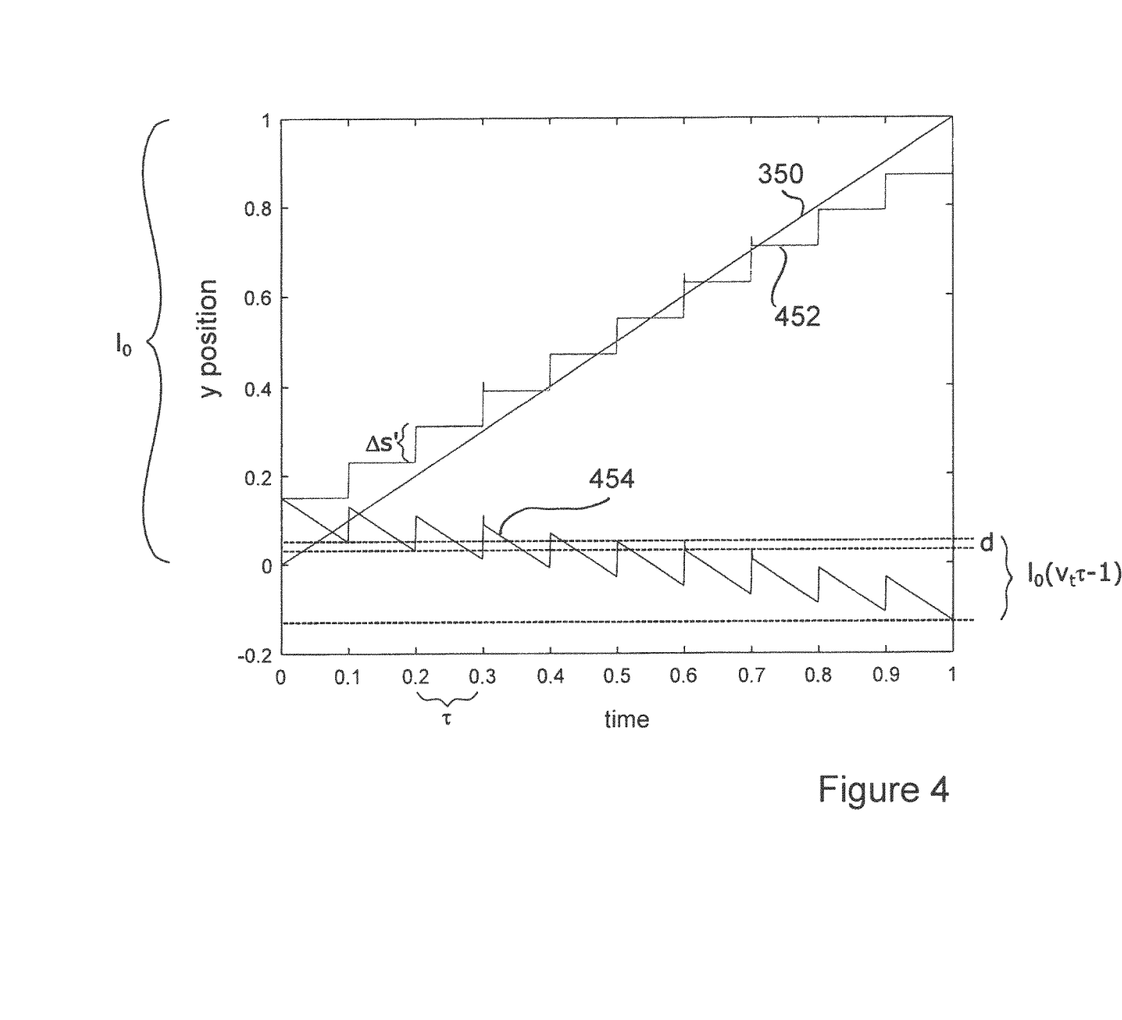
FIG. 4 is a time diagram illustrating another embodiment for controlling the motorized object stage and the optical scanning unit of the microscope shown in FIG. 1.

FIG. 4 shows a time diagram illustrating a modified example for controlling the motorized object stage 108 and the optical scanning unit 124 in order to avoid movement artefacts from occurring. The control method shown in FIG. 4 differs from the method of FIG. 3 in that an amount Δs' is applied when resetting the optical scanning unit 124 before starting the next image acquisition. This can be seen from a plane trajectory 452 being different from the corresponding plane trajectory 352 shown in FIG. 3. The reset amount Δs' differs from the amount Δs according to equation (1) by a drift d as defined in equation (2) mentioned above. In particular, the amount Δs' is reduced by the drift d. Referring to FIG. 2, the drift d represents a drift of the field of view associated with the image sensor 132 (from 642 to 644 in FIG. 2) utilizing the field of view reserve Fa in direction y. Specifically, the drift d refers to a single image acquisition as can be seen from a scanning trajectory 454 in FIG. 4 corresponding to the scanning trajectory 354 shown in FIG. 3.

As shown in FIG. 4, the drift d referring to a single image acquisition accumulates over a sequence of single images to a total drift D as defined in equation (3). In particular, the total drift D takes into account an object dimension 10 in direction y which is known in advance or at least limited. In FIG. 4, the total drift D can be derived from the scanning trajectory 454 corresponding the scanning trajectory shown in FIG. 4.

Figure 5:
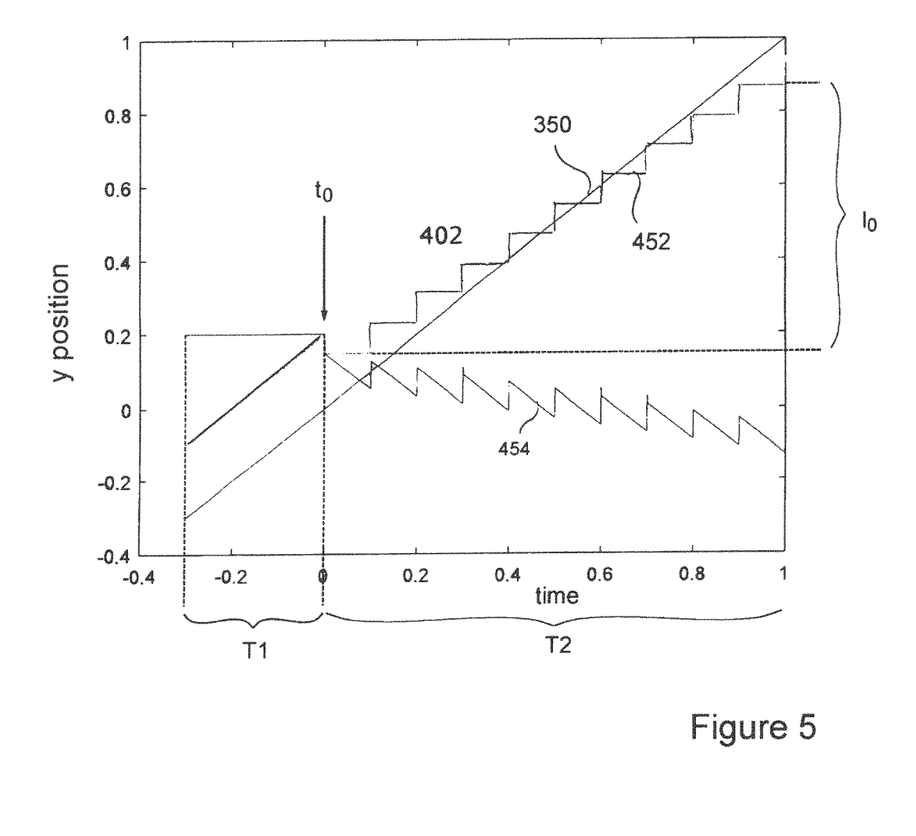
FIG. 5 is a time diagram illustrating another embodiment for controlling the motorized object stage and the optical scanning unit of the microscope shown in FIG. 1.

FIG. 5 shows a time diagram illustrating another modified example for controlling the motorized object stage 108 and the optical scanning unit 124. The control method shown in FIG. 5 differs from the method of FIG. 4 in that a starting condition is determined at a time t0 before the actual image acquisition is performed. The afore-mentioned starting condition may be determined by analyzing a test image which may be generated with relatively low image quality, e.g. low data rate, low illumination and/or long exposure time. Specifically, an example may be considered in which a certain portion of the object stage 108 comprises only single regions of interest, e.g. distinct objects being spatially separated from each other. Thus, a single region of interest may be easily detected by analyzing the test image. As long as analyzing the test image does not indicate the occurrence of a single region of interest, as indicated by a period T1 in FIG. 5, the object stage 108 may be continuously moved at a constant speed while the plane OE is kept stationary relative to the optical imaging system 104, 106. In other words, the optical scanning unit 124 is not operated to move the plane OE relative to the optical imaging system 104, 106 during the period T1. Only when a region of interest is detected at to, the optical scanning unit 124 starts moving the plane OE relative to the optical imaging system 104, 106 during the subsequent period T2.

Figure 6:
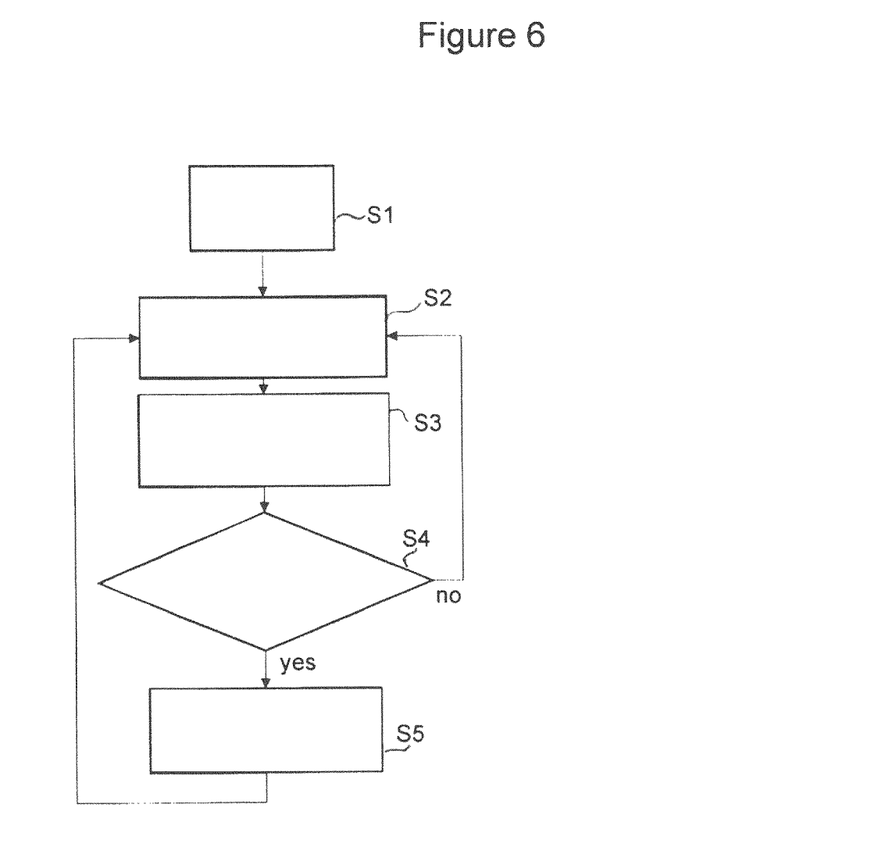
FIG. 6 is a flow diagram illustrating a control method according to the embodiment shown in FIG. 5.

FIG. 6 is a flow diagram illustrating an exemplary process for performing an image acquisition according to the embodiment shown in FIG. 5.

After starting the process in step S1, the object stage 108 is moved at a constant speed in step S2. While moving the object stage 108, a low quality image is continuously captured without moving the plane OE relative to the optical imaging system 104, 106 in step S3, said low quality image representing the afore-mentioned test image. Further, the test image is analyzed in order to detect a region of interest. In step S4, an inquiry is performed as to whether or not a region of interest has been detected. In case that a region of interest has not been detected in step S4, the process continues to move the object stage 108 (step S2) and to capture the test image (step S3) without moving the plane OE relative to the optical imaging system 104, 106. However, in case that a region of interest has been detected in step S4, the process proceeds to step S5 in which a high quality image acquisition is performed while moving the plane OE relative to the optical imaging system 104, 106 in order to avoid movement artefacts as described above. After the high quality image acquisition has been completed, the process returns to step S2 in order start low quality image acquisition again.

Specific embodiments have been described above. Needless to say that the present invention shall not be limited to these embodiments. For instance, the microscope 100 shown in FIG. 1 forms a light sheet microscope in OPM configuration. However, any other type of microscope may be used as long as such a microscope enables a tracking movement of the plane to be imaged.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope
102 optical illumination system
104 optical transport system
106 optical detection system
108 motorized object stage
110 object
112 light sheet generating device
114 objective
116 intermediate image space
104 optical transport system
118 objective
120 tube lens
122 scan lens
124 optical scanning unit
126 scan lens
128 tube lens
130 objective
132 image sensor
134 tube lens
136 objective
138 controller
350 stage trajectory
352 plane trajectory
354 scanning trajectory
640 first field of view
642, 644 second field of view
Fa field of view reserve
Fo length of first field of view in y direction
Fc length of first field of view in y direction

The invention claimed is:

1. A microscope, comprising:
a motorized object stage configured to move an object;
an optical imaging system configured to form an optical image of a plane (OE) in which the object is to be optically imaged;
an optical scanning unit configured to move the plane (OE) to be optically imaged by the optical imaging system relative to the optical imaging system;
an image sensor configured detect the optical image of the plane (OE) formed by the optical imaging system; and
a controller configured to control the motorized object stage and the optical scanning unit for simultaneously moving the object and the plane (OE) in a same direction relative to the optical imaging system while the optical image is being detected by the image sensor, wherein the optical imaging system has a first field of view and the image sensor has a second field of view, the second field of view being encompassed by the first field of view.

2. The microscope of claim 1, wherein the controller is configured to control the motorized object stage and the optical scanning unit such that the plane (OE) is stationary relative to the object while the optical image is being detected by the image sensor.

3. The microscope of claim 1, wherein the controller is configured to control the motorized object stage and the optical scanning unit such that the second field of view including the optical image of the plane (OE) is kept encompassed by the first field of view while the second field of view is being detected by the image sensor and being moved thereon.

4. The microscope of claim 1, wherein an area of the first field of view currently not overlapped by the second field of view forms a field of view reserve to be used for enabling the second field of view to move within the first field of view.

5. The microscope of claim 1, wherein the controller is configured to control the motorized object stage for moving the object at a constant speed.

6. The microscope of claim 1, wherein the controller is configured to control the image sensor for detecting the optical image in a sequence of consecutive images, each image of the sequence of consecutive images representing the optical image.

7. The microscope of claim 6, wherein the controller is configured to control the optical scanning unit for moving the plane (OE) at a constant speed while each image of the sequence of consecutive images is being detected by the image sensor.

8. The microscope of claim 6, wherein the controller is configured to control the optical scanning unit for moving the plane (OE) starting from an initial position to an end position while each image of the sequence of consecutive images is being detected by the image sensor.

9. The microscope of claim 8, wherein the initial position is the same for all images of the sequence of consecutive images.

10. The microscope of claim 8, wherein the controller is configured to let the initial position drift within the sequence of consecutive images.

11. The microscope of claim 1, wherein the controller is configured to determine a predetermined starting condition for simultaneously moving the object and the plane (OE), the object being moved and the plane (OE) being kept stationary relative to the optical imaging system before determining the starting condition.

12. The microscope of claim 11, wherein the controller is configured to control the image sensor for detecting a test image and to analyze the test image for determining the predetermined starting condition, the predetermined starting condition indicating a region of interest of the object being captured by the test image.

13. The microscope of claim 1, wherein the microscope comprises a light sheet microscope.

14. A method for imaging an object using a microscope, comprising:
  moving the object by a motorized object stage;
  forming an optical image of a plane (OE) in which the object is to be optically imaged by an optical imaging system;
  moving the plane (OE) to be optically imaged by the optical imaging system relative to the optical imaging system by an optical scanning unit;
  detecting the optical image of the plane (OE) formed by the optical imaging system by an image sensor; and
  controlling the motorized object stage and the optical scanning unit for simultaneously moving the object and the plane (OE) in a same direction relative to the optical imaging system while the optical image is being detected by the image sensor, wherein the optical imaging system has a first field of view and the image sensor has a second field of view, the second field of view being encompassed by the first field of view.

15. A microscope, comprising:
  a motorized object stage configured to move an object;
  an optical imaging system configured to form an optical image of a plane (OE) in which the object is to be optically imaged;
  an optical scanning unit configured to move the plane (OE) to be optically imaged by the optical imaging system relative to the optical imaging system;
  an image sensor configured detect the optical image of the plane (OE) formed by the optical imaging system; and
  a controller configured to control the motorized object stage and the optical scanning unit for simultaneously moving the object and the plane (OE) in a same direction relative to the optical imaging system while the optical image is being detected by the image sensor,
  wherein the controller is configured to determine a predetermined starting condition for simultaneously moving the object and the plane (OE), the object being moved and the plane (OE) being kept stationary relative to the optical imaging system before determining the starting condition.

* * * * *